May 17, 1949. W. H. FURNESS 2,470,299
METHOD OF AND APPARATUS FOR LIQUID
TREATMENT OF YARNS
Filed July 26, 1946 9 Sheets-Sheet 1

Inventor:
WILLIAM H. FURNESS
By Attorneys

May 17, 1949.  W. H. FURNESS  2,470,299
METHOD OF AND APPARATUS FOR LIQUID
TREATMENT OF YARNS

Filed July 26, 1946  9 Sheets-Sheet 9

INVENTOR
William H Furness
BY
ATTORNEYS

Patented May 17, 1949

2,470,299

UNITED STATES PATENT OFFICE 2,470,299

METHOD OF AND APPARATUS FOR LIQUID TREATMENT OF YARNS

William H. Furness, Haddonfield, N. J., assignor to American Viscose Corporation, Wilmington, Del., a corporation of Delaware Application July 26, 1946, Serial No. 686,341

14 Claims. (Cl. 8—151.1)

This invention relates to a method of and apparatus for imparting liquid treatments to yarns, and it is especially useful in the manufacture of rayon, particularly when made by the so-called continuous process of manufacture.

The nature, objects and advantages of the invention will be best understood from the following brief statement of conventional practice.

In the manufacture of viscose rayon, one conventional method is to lead the freshly spun yarn to a thread storage and collecting device or reel upon which the yarn is laid in the form of a helix, and to pass the yarn from that thread storage device or reel successively to a plurality of similar reels, and finally to a collecting device. On each of these reels the helix of yarn is subjected to a liquid treatment of one kind or another, with the exception of the last reel, which is ordinarily a dryer. Usually about ten such reels are required.

The advantage of performing all or most of the treatment operations on a single thread storage thread advancing device, has long been appreciated. The various treatment liquids applied should be kept separate, i. e., they should not intermingle, and they should be separately collected for the purpose of recovering the chemicals, which is necessary for economic reasons. Because of difficulty in accomplishing this, it has been the practice to employ a plurality of individual treatment reels, one for each treatment, instead of a single reel.

The primary object of the invention is to provide an effective method and apparatus by virtue of which the various treatment liquids may be applied on a single, relatively long, thread storage device or reel on which the yarn is laid up in the form of a helix, without intermingling and in such fashion that the respective liquids are separately collected.

The invention finds especial usefulness in the production of viscose rayon, but is also useful in the production of other types of rayon in which a number of treating operations are involved, such, for example, as cuproammonium yarn.

In the practice of the invention, I may carry out not only all of the liquid treatment operations but also the drying operation, on a single reel. I prefer, however, to perform the drying operation separately, employing two reels—a relatively long one for the liquid treatments and a relatively short one for the drying treatment.

A slowly rotating type of reel lends itself most effectively to the practice of the invention. Such a reel is disclosed in my copending application Serial No. 578,599, filed February 19, 1945, and issued as U. S. Patent No. 2,456,120 on December 14, 1948. In that type of reel, the yarn is led to and laid on one end of the reel by a rapidly rotating whirler device, is advanced along the reel in the form of a helix, and is taken off the other end of the reel by another whirler device, turn for turn. The reel is rotated very slowly, i. e., just a few revolutions per minute, usually in a direction the reverse of the direction of rotation of the whirler devices.

Very generally stated, I apply and remove and collect the various treatment liquids as follows: Along one side of the reel, preferably the upwardly moving side, I provide a compartmented, longitudinally extending device, there being one compartment for each treatment liquid to which the respective treatment liquid is led. This device preferably only partially surrounds the reel, although, as hereinafter pointed out, the reel may be entirely surrounded by employing a plurality of the devices, and it is mounted for compound movement with respect to the reel. It is not only movable toward and away from the reel, but also is rotatably movable concurrently with the reel and also in the reverse direction. When it is moved into contact with the helix on the reel, it moves with the reel as the latter rotates and at an angle corresponding to the pitch of the helix. During this contact and this concurrent movement, liquid from the respective compartments is forced or displaced or pumped into the helix and immediately withdrawn or sucked back into the respective compartment, quite a number of times, i. e., with quite a number of pulsations, thus subjecting the turns of the helix to the respective treatment liquid with a scrubbing action. The respective liquid treatment can thus be accomplished effectively in a relatively short space, lengthwise of the reel. At the end of this concurrent movement, the device is moved away from contact with the helix and then shifted backwards, i. e., in a direction reverse to that of the rotation of the reel, to the starting point when it is again brought into contact with the helix. When the device is moved away from or out of contact with the helix, the pumping pulsations are stopped, so that no liquid is pumped out of the respective compartments; and the pumping pulsations are again instituted when the device is about to be again brought into contact with the helix.

Between each pair of liquid compartments, a suction compartment is provided. These suction compartments are under suction during the interval the device is in contact with the helix, in consequence of which any liquid carried by the yarn or otherwise, past the end of one liquid compartment, is sucked into the adjacent suction compartment, thus preventing substantial comingling of liquid applied from one liquid compartment with liquid applied by the next liquid compartment. Just before the device is moved out of contact with the helix, the suction for the suction compartments is cut off, so that, as the device moves away from the helix, the turns are not subject to the pull of the suction.

One embodiment of apparatus suitable for carrying out the foregoing is illustrated in the accompanying drawings, wherein—

Figure 1:
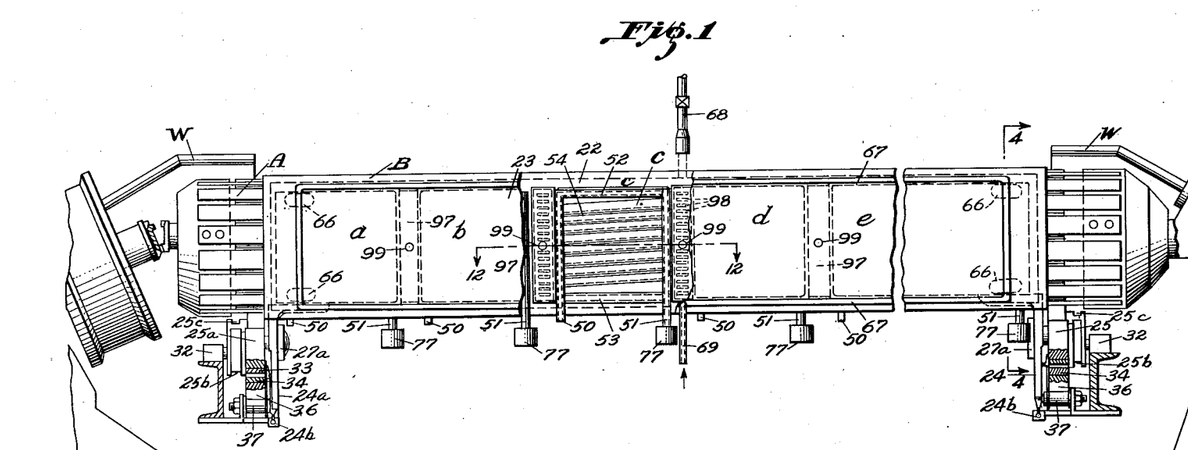
Fig. 1 is a more or less diagrammatic sectional elevational view of apparatus constructed in accordance with my invention, certain parts being broken away, to show interior constructions.

The cylinder A, indicated diagrammatically in Fig. 1, is preferably of the type shown and described in my aforesaid copending application Serial No. 578,599, issued as U. S. Patent No. 2,456,120 on Dec. 14, 1948, and in this instance comprises sixteen pairs of the longitudinally extending thread receiving bars 20, 21 (see Figs. 4 and 5), along which the thread is moved to form a continuous polygonal shaped helix. By referring to the diagrammatic showing of the cylinder in Fig. 2, it will be seen that the cylinder in cross section is in the shape of a sixteen sided polygon.

My chemical treating and washing apparatus for a continuous wet process machine employing a cylinder of the above character comprises the following combination of parts.

A box-like arcuate device or housing B, divided into a plurality of sections or stations $a$, $b$, $c$, $d$, and $e$ lengthwise of the housing, is arranged peripherally of the cylinder A and is of such circumferential extent as to cover approximately one-fourth of the cylinder. The number of compartments will vary with the number of liquid treatments required. The interior construction of each of these sections is similar, but before describing their construction in detail, the construction, movement, and operating mechanisms of the arcuate housing B as a whole, will be described.

The housing B comprises an arcuate body 22 and an arcuate cover 23, preferably constructed of a resin such as a phenol formaldehyde condensation product, mounted for movement toward and away from the cylinder and for movement circumferentially of the cylinder, as heretofore described. The substantially concave inner face of the housing B is lined with padding, preferably of felt, as indicated at 22a in Fig. 7.

To accomplish the above movements a pair of downwardly extending arms 24, 24a are secured to the body 22, one at each end thereof, which arms are pivotally mounted on arcuate gear members 25, 25a, respectively, by means of ball shaped pivot pins 26, 26a, it being observed that bearing members 27, 27a secured to the arms 24, 24a are provided for the pivot pins.

The arcuate gear members 25, 25a are each mounted for movement back and forth circumferentially of the cylinder A by means of a pair of spaced lower supporting guide rollers 28, 28 and an upper central guide roller 29. The lower convex faces 25b of the arcuate members 25, 25a and the upper concave faces 25c thereof are flanged to receive the rollers, thus preventing lateral displacement of the members. The lower supporting guide rollers 28, 28 are mounted on main frame members 30 of the machine, as by means of pins 31, and the upper guide rollers 29 are mounted in bearing blocks 32 secured to these frame members.

The arcuate members 25, 25a are each provided with a segment of gear teeth 33 adapted to mesh with flat gear racks 34, carried by bars 36 mounted for back and forth movement on flanged guide rollers 37, carried by the frame members 30. Reciprocating motion is imparted to the bars 36 by means of a cam 38 mounted on a shaft 38a, adapted to be rotated in the direction of the arrow shown in Fig. 2, by any suitable driving mechanism. The reciprocating bars 36 are provided with cam rollers 39 and are held in contact with the cams 38 as by means of springs 40.

Figure 2:
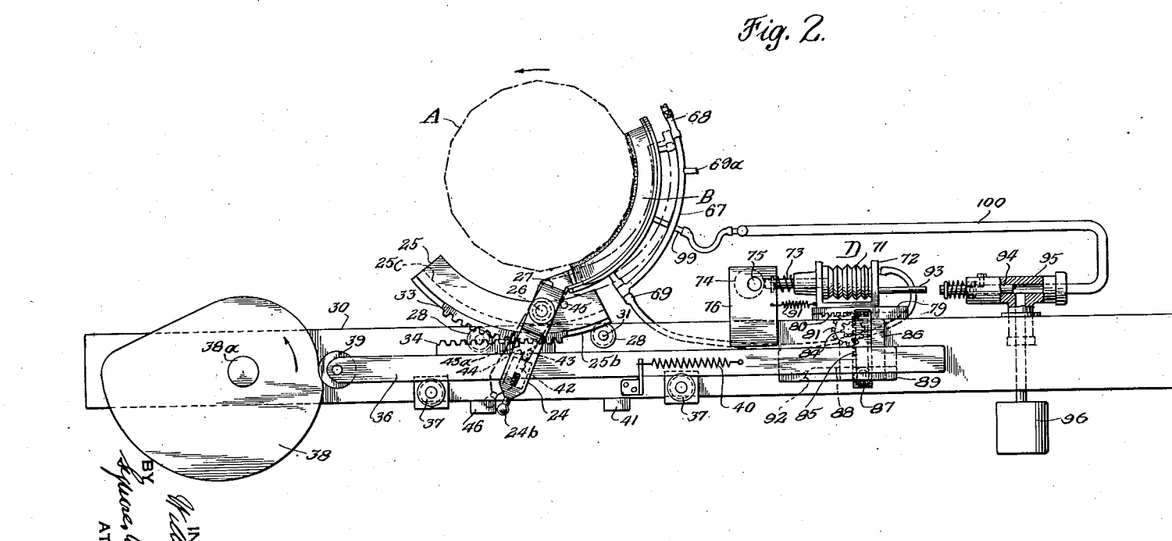
Fig. 2 is a more or less diagrammatic assembly view, crosswise of the apparatus.

The driving mechanisms for the shaft 38a and the cylinder A are preferably so relatively designed that the cam 38 will rotate eight times as fast as the cylinder A. Thus when the cam makes one-half of a revolution, the cylinder will rotate one sixteenth of a revolution or through 22½°. Following through this movement of the cam, it will be seen that in Fig. 4, the arm 24 is in an inclined position and that the housing B covers the pairs of bars $f$, $g$, $h$, $j$, and $k$, so that four sides, $l$, $m$, $n$ and $o$ of the polygonal shaped cylinder are covered. As the cylinder moves through 22½° in the direction of the arrow, the arcuate housing moves through substantially 22½° in the same direction due to the reciprocating bar 36 being moved by the cam from the position shown in Fig. 4 to the position shown in Fig. 5. Thus the rack 34 which is carried by the bar 36, causes the arcuate gear member 25 to rotate from the position shown in Fig. 4 to the position shown in Fig. 5.

Since the cam and cylinder are timed 8 to 1 as above mentioned, the housing and cylinder move together in the part of the cycle of operation just described, and the same four sides, l, m, n and o of the polygonal shaped cylinder remain covered.

Figure 5:
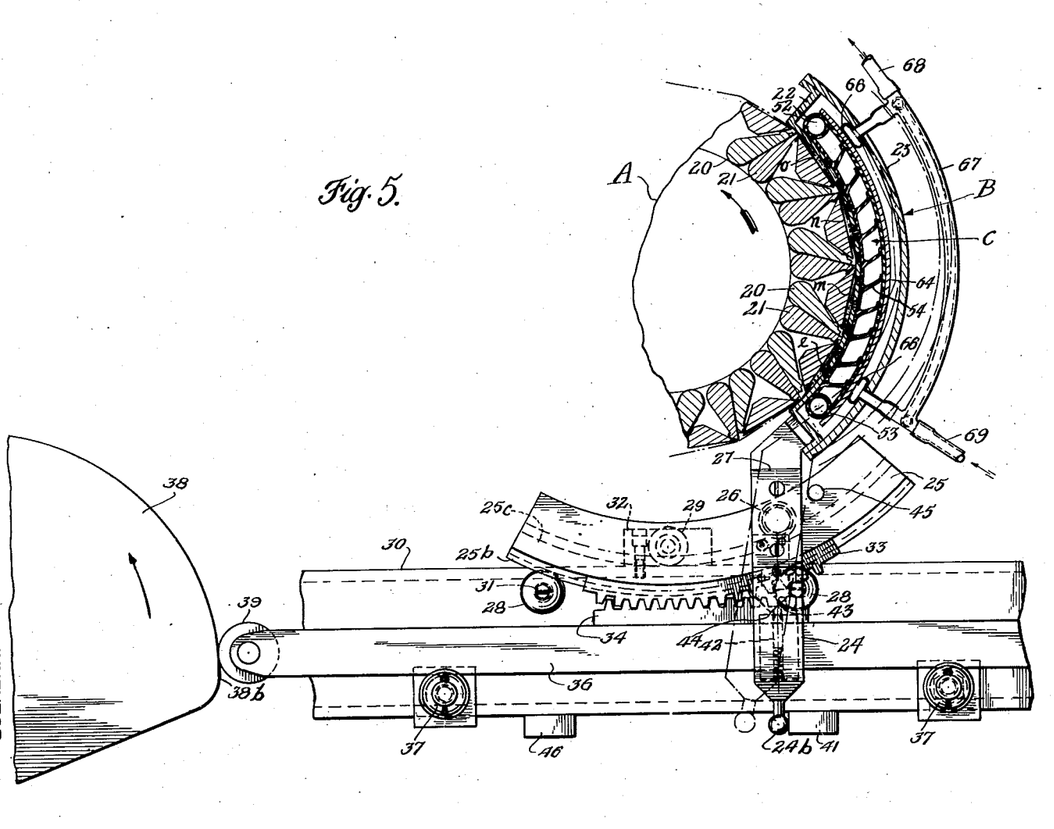
Fig. 5 is a fragmentary cross section similar to Fig. 4 but showing the parts in another position.

By referring to Fig. 5, it will be noted that the ball end 24b of the arm 24 has just come into contact with the fixed stop member 41 and that the cam 38 has not quite reached its highest point 38b. In this position a snap plunger 42 carried by the arm 24 engages the inclined surface 43 of a lug 44 carried by the arcuate member 25, thus resiliently holding the housing B against the cylinder. However, upon slight further rotation of the cam 38 to the position shown in Fig. 3, the arm 24 is tripped into the position shown and the housing swings away from the cylinder. A pin 45 carried by the arcuate member 25 limits the movement of the arm and housing in this direction. The snap plunger 42 now assumes the position shown in Fig. 3, in which it is in engagement with the inclined surface 43a of the lug 44.

Figure 3:
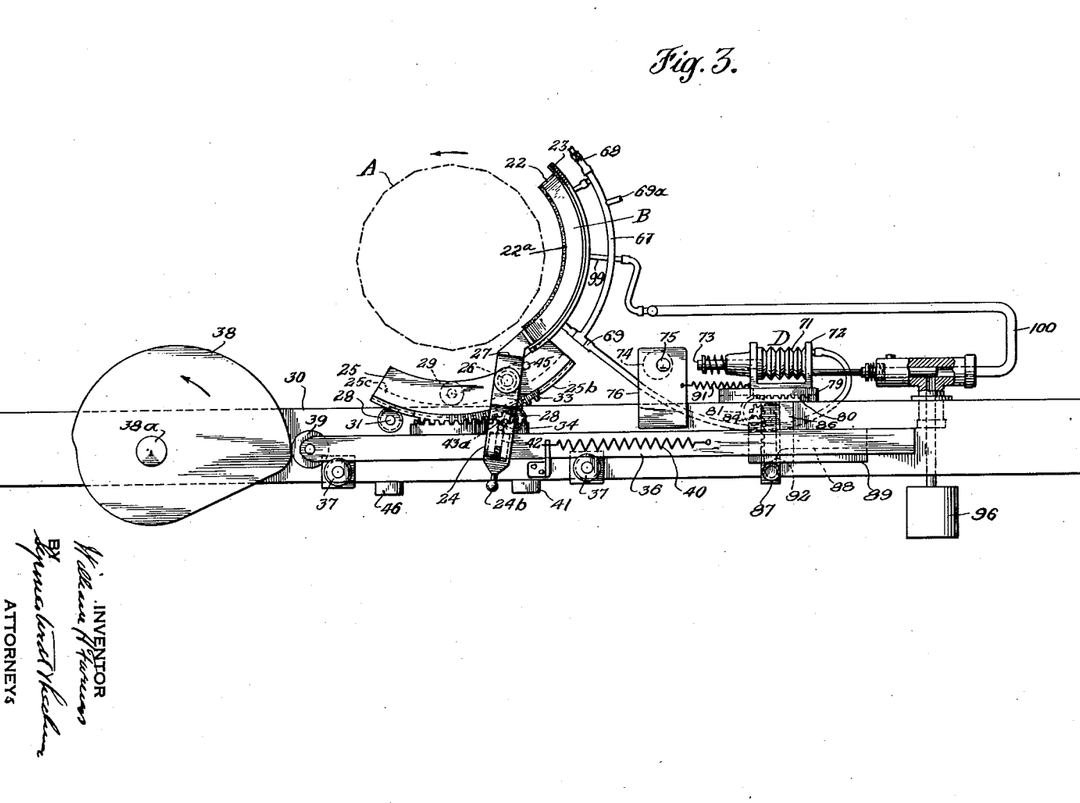
Fig. 3 is a fragmentary view similar to Fig. 2, showing the parts in another position.
Figure 4:
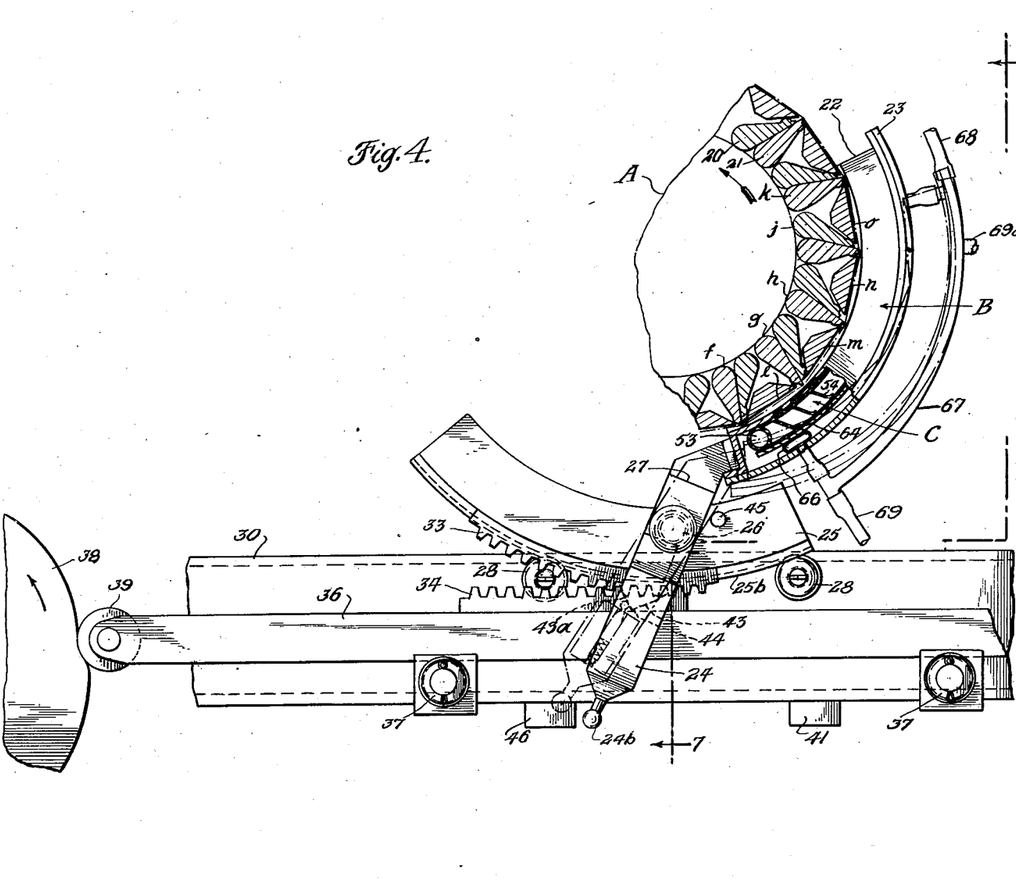
Fig. 4 is an enlarged fragmentary across section taken substantially on the line 4—4 of Fig. 1.

As the cam continues to rotate, the arcuate member 25 is moved in the opposite direction, i. e., to the left as viewed in Figs. 2 to 5 inclusive, until the cam reaches its lowest point as shown in Figs. 2 and 4. However, just before the cam arrived at its lowest point, the ball end 24a of the arm 24 struck the stop 46 and snapped the arm 24 into the full line position shown, to again bring the housing into contact with the cylinder.

Referring now to the interior construction of the housing B, each section or station thereof contains what may be called a rubber displacement-suction bag or unit indicated as a whole by the reference letter C and shown in detail in Figs. 8, 9, 10 and 11. These suction bags or units each comprise a pair of end tubes 50 and 51, a top cross tube 52, a bottom cross tube 53, a plurality of vertically spaced inclined semi-circular channels 54 extending from end tube to end tube and inclining downwardly from the end tube 51 to the end tube 50, an inner wall 55 for the unit and an outer wall or cover 56 for the unit. The channels 54 may be extruded from the inner wall 55 of the unit and they are secured to the end tubes 50 and 51 as by means of vulcanizing.

Figure 8:
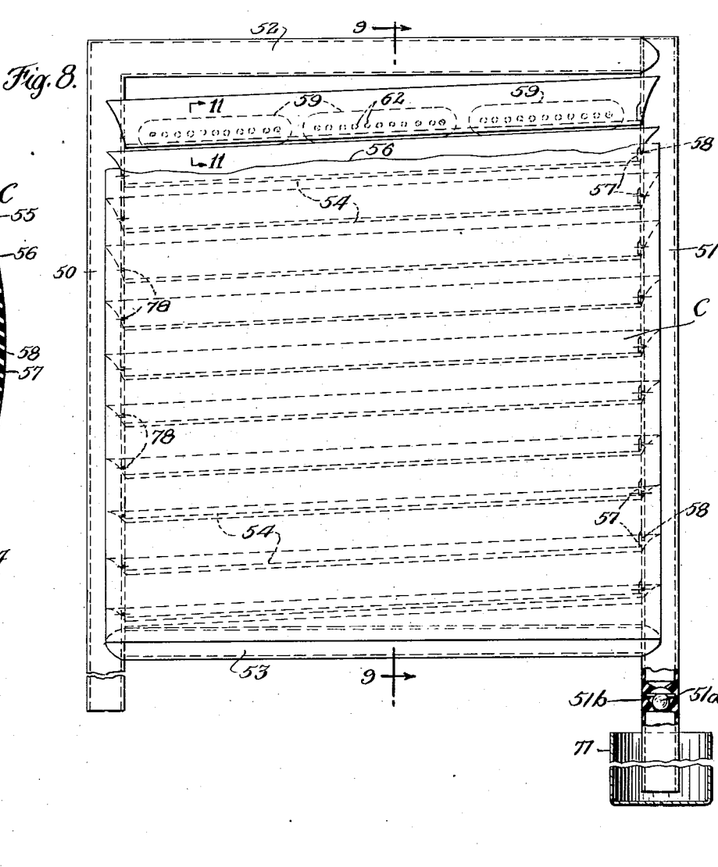
Fig. 8 is a face view of a suction unit I employ.
Figures 9, 10, 11:
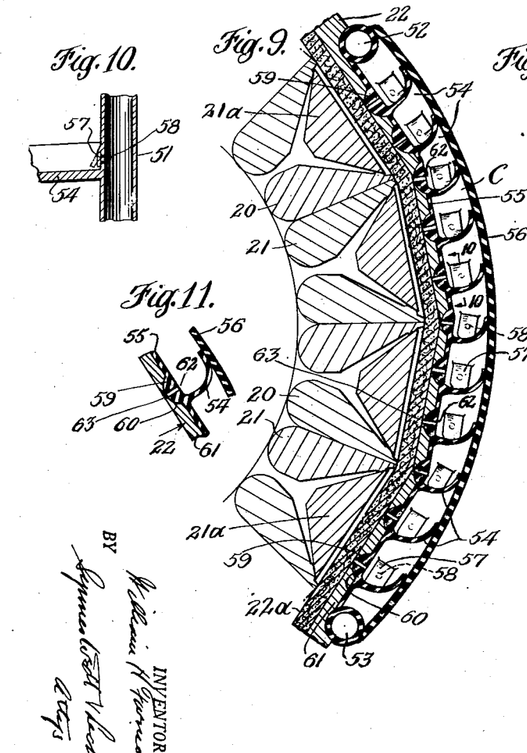
Fig. 9 is a cross section taken substantially on the line 9—9 of Fig. 8.
Fig. 10 is a fragmentary cross section taken on the line 10—10 of Fig. 9.
Fig. 11 is a fragmentary cross section taken on the line 11—11 of Fig. 8.
Figure 12:
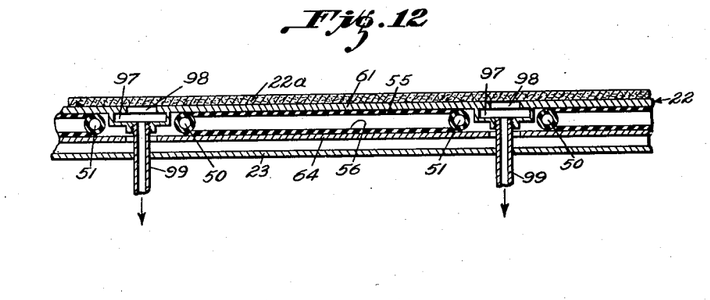
Fig. 12 is a fragmentary cross section on the line 12—12 of Fig. 1.

The end tube 51 is provided with a plurality of flaps 57, one for each channel 54, which cover small holes 58 in the tube 51 located just above the bottom of the channels (see Fig. 10). The inner wall 55 of the unit is provided with a plurality of longitudinally extending ribs 59 of semicircular cross section, arranged in sets of three, as shown in Fig. 8, and there being one such set located just above the bottom of each channel 54. These ribs fit into suitably spaced curved grooves 60 in the inner wall 61 of the housing B and are provided with a plurality of spaced holes 62 matching with similarly spaced holes 63 in the grooves 60 of the wall 61. In the lower portion of the end tube 51 I have provided a ball valve 51a seating in a valve seat 51b.

Referring now to Figs. 1 and 5, it will be seen that a curved backing pressure plate 64 rests against the outer wall or cover 56 of the suction unit C and extends from one end of the housing to the other end thereof, so as to act as a pressure plate for all of the units C at the same time in a manner now to be described.

The purpose of the pressure plate 64 is to compress the suction bags or units so as to temporarily displace or force liquid contained therein through the holes 62 and 63 to the felt padding 22a, lining the inner wall 61 of the housing and from thence to the helix of yarn upon the cylinder. In order to accomplish this, I have provided a plurality of boot shaped expanders 66, in this instance four being shown, see Figs. 1, 5 and 6, which fit between the pressure plate 64 and the cover plate 23 of the housing B. These expanders 66 are connected to a closed pipe line 67 provided with an air bleeder 68 and a water supply pipe 69 leading from a Sylphon pump device D (see Fig. 13). Water is admitted to this closed pipe line from a suitable source of supply as at 69a, Figs. 2 and 3, and the air in the line escapes through the bleeder 68.

Referring now to Figs. 13 to 16 inclusive, the Sylphon pump device D for actuating the rubber suction bags or units C above described, comprises a Sylphon 71, a movable frame 72 in which the Sylphon is mounted, a piston rod 73 connected to the Sylphon, an eccentric 74 mounted on a rotatable shaft 75, a bearing member 76 for the shaft 75 secured to the main frame member of the machine 30, and rack and gear mechanism indicated as a whole by the reference letter E for effecting movement of the Sylphon toward and away from the eccentric 74 in a manner and for purposes presently appearing.

Figure 13:
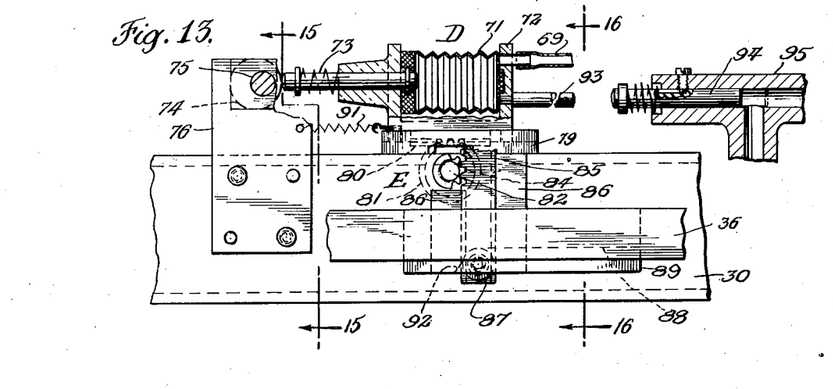
Fig. 13 is a fragmentary elevational view of a bellows arrangement I employ.
Figure 14:
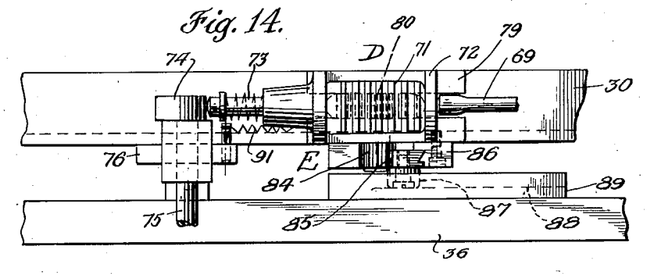
Fig. 14 is a plan view of Fig. 13.

With the Sylphon in the position shown in Figs. 13 and 14, rotation of the eccentric 74 causes a pumping action of the Sylphon and these impulses are transmitted to the expanders 66 by means of the supply pipe 69 and closed pipe line 67. Thus, as the expanders expand and contract due to these impulses, the rubber suction bags are compressed and expanded. This action causes the flaps 57 of the suction units to open and close, thereby causing liquid to be sucked up from liquid containers 77 located at the bottom of the end tubes 51 of the units to fill the back, and to be forced through the holes 62 and 63 through the felt padding 22a to flush the yarn carried on the cylinder A. Since the units C also have a suction action, it will be seen that liquid forced into the helix is immediately sucked back into the units, and this liquid works down the inclined channels or troughs 54, giving a counter-current effect insofar as application of the liquid to the turns is concerned. The liquid finally drains out through drain holes 78 in the end tubes 50 to the bottom of the end tubes for reuse or recovery.

The above action of the suction units continues during the part of the cycle of operation in which the arcuate housing B is in contact with the cylinder, i. e., during the period the housing is moving from the position shown in Fig. 2 to the position shown in full lines in Fig. 5.

In this connection, it is pointed out that just before the cam 38 reaches the high point where it trips the arms 24, 24a and the housing B into the position shown in Fig. 3, the Sylphon 71 and its piston rod 73 are moved in a direction away from the eccentric 74, thus causing the impulses transmitted thereby to the suction units C to stop and preventing threads from being pulled by suction when the housing B swings away from the cylinder A.

Figure 15:
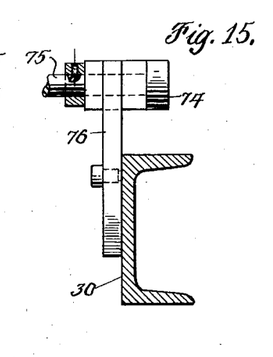
Fig. 15 is a cross section taken on the line 15—15 of Fig. 13.
Figure 16:
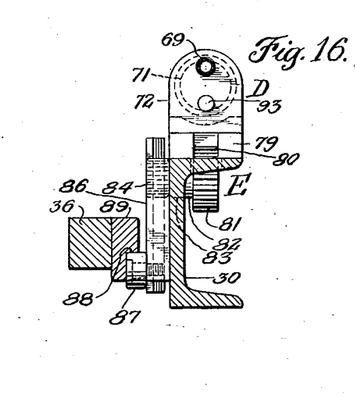
Fig. 16 is a cross section taken on the line 16—16 of Fig. 13.

In order to accomplish this, it will be seen by reference to Figs. 13 to 15 inclusive that the Sylphon frame 72 is movably mounted in a dovetailed guide 79, secured to the main frame member 30, and is provided with rack teeth 80 adapted to mesh with a gear 81, secured on a shaft 82, having a bearing 83 in the main frame member 30. A second gear 84 is also secured on the shaft 82 and meshes with a vertically disposed rack 85, mounted for reciprocation in a dovetailed guide 86. A roller 87 is mounted at the lower end portion of the rack 85 and engages a cam track 88, provided at the bottom portion of a plate 89 secured to the bar 36.

Referring particularly to Fig. 13, it is to be noted that the Sylphon piston rod 73 is held in contact with the eccentric 74 by means of a spring 91, attached at one end to the movable bellows frame 72 and, at its other end, to the fixed bearing member 76, and that the bar 30 is shown moved to a position in which the curved cam surface 92 of the cam track 88 is ready to move the cam roller 87 into the position shown in Fig. 3. When the cam roller 87 moves to this position, the vertical rack 85 moves downwardly, and causes the gears 84 and 81 to rotate in a clockwise direction. Since the gear 81 meshes with the ratchet teeth 80 of the bellows frame, the piston rod 73 is moved to the right, i. e., in a direction away from the eccentric 74.

As the Sylphon frame thus moves to the right, a pin 93 carried thereby engages a plunger valve 94 mounted in a valve housing 95. This valve controls a connection between a source of vacuum diagrammatically indicated at 96 and a plurality of vacuum chambers 97 located between the sections or stations $a$, $b$, $c$, $d$, and $e$ to prevent the mixing of liquids from one station to another. Each vacuum chamber 97 is in communication with the felt padding 22a by means of a plurality of slots 98 in the inner wall 61 of the housing B, and has a pipe 99 leading therefrom to the vacuum line 100 in which the vacuum control valve 94 is located (see Figs. 2 and 3). Thus, with the parts in the position shown in Fig. 2, the valve 94 uncovers the lower branches of the vacuum line 100 and establishes vacuum connection between the source of vacuum 96 and the vacuum chambers 97, and when the valve 94 is moved to the right, as above described, the lower branch of the vacuum line is covered and the vacuum connection to the vacuum chambers 97 is broken as shown in Fig. 3.

It will be seen from the foregoing that since cam 38 revolves eight times as fast as the cylinder A, any given pair of bars 20, 21 of the cylinder will move 22½° in the direction of the arrow while the cam is making one-half of a revolution, and that since the housing B moves in a direction opposite to the direction of rotation of the cylinder in going from the position in Fig. 5 to the position in Fig. 4, under influence of the cam in one-half revolution, two new sets of bars or two new sides of the polygonal cylinder will be subject to liquid treatment, and two sides of the cylinder previously treated will still remain covered by the housing to receive a second treatment.

A résumé of a cycle of operation is as follows: With the housing B in the starting position shown in Fig. 2, the Sylphon pump device D imparts its pulsations to the suction units so that liquids contained therein are forced onto and sucked back from the turns of the helix, while excess liquids flow down the channels of the unit and into the end tube 50 where they may be reclaimed or recirculated. At the same time, the vacuum chambers 97 are subject to vacuum to prevent liquid from one station of the cylinder passing to the next station. The above action continues during substantially one-half revolution of the cam 38 and, just before the end of the half revolution, the Sylphon pump moves away from its eccentric to stop its pulsating action and the valve which controls the vacuum line to the chambers 97, is thus closed. Next the housing is tripped to move away from the cylinder, and is then rotated in a direction opposite to the direction of the rotation of the cylinder, back to the starting position shown in Fig. 2.

It is also to be observed in connection with the pumping of liquid into the helix and the sucking back of such liquid, that this action is facilitated by reason of the fact that between each pair of thread carrying bars 20 and 21, there is interposed a triangular shaped filler bar 21a, see Fig. 9. Thus the reel or cylinder presents what is in effect a substantially uninterrupted, i. e., a continuous surface. Thus liquid forced into the helix is locally confined to the periphery of the reel and can therefore be readily sucked back. Due to the alternate pumping and sucking, the turns of the helix are effectively subjected to a scrubbing action of the treating liquid. This in turn makes it possible to effectively apply each treatment liquid in a relatively short portion of the cylinder lengthwise thereof, which decreases the overall length of the reel.

Figure 7:
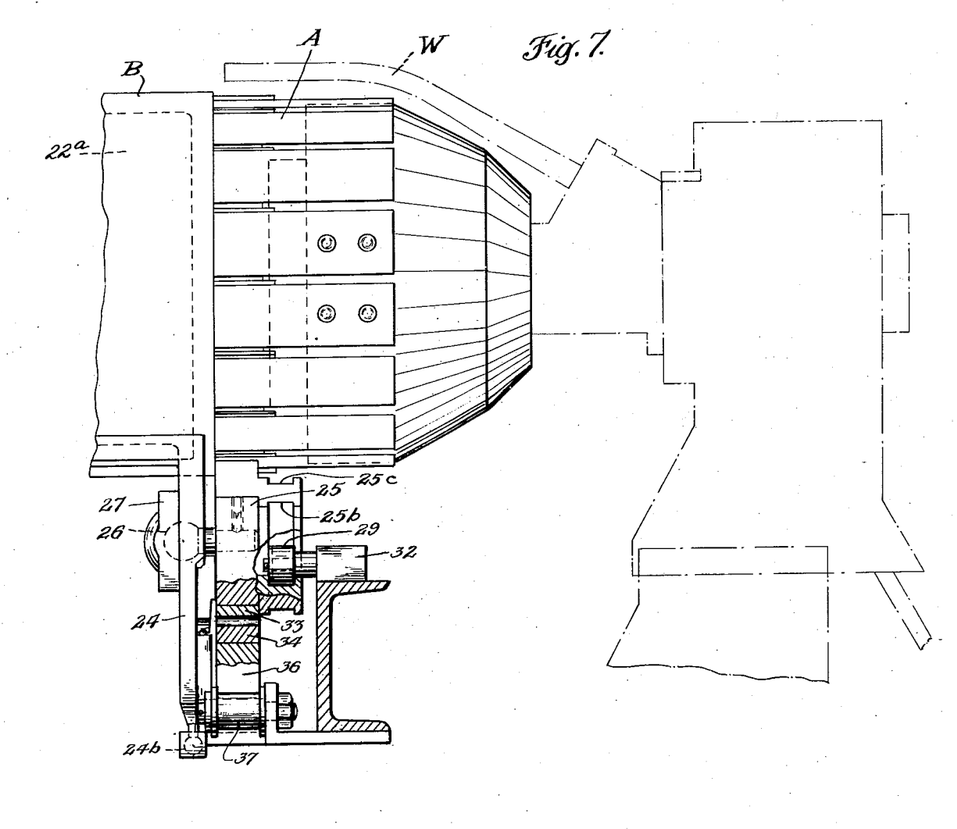
Fig. 7 is a fragmentary enlarged sectional view partly in section on the line 7—7 of Fig. 4.

It will readily be seen that all of these operations can be effectively carried out, because, in the type of reel or thread carrying cylinder shown, the reel is being very slowly rotated, while the thread is being laid on and taken off the reel by whirler devices such as indicated at W in Figs. 1 and 7.

Figure 6:
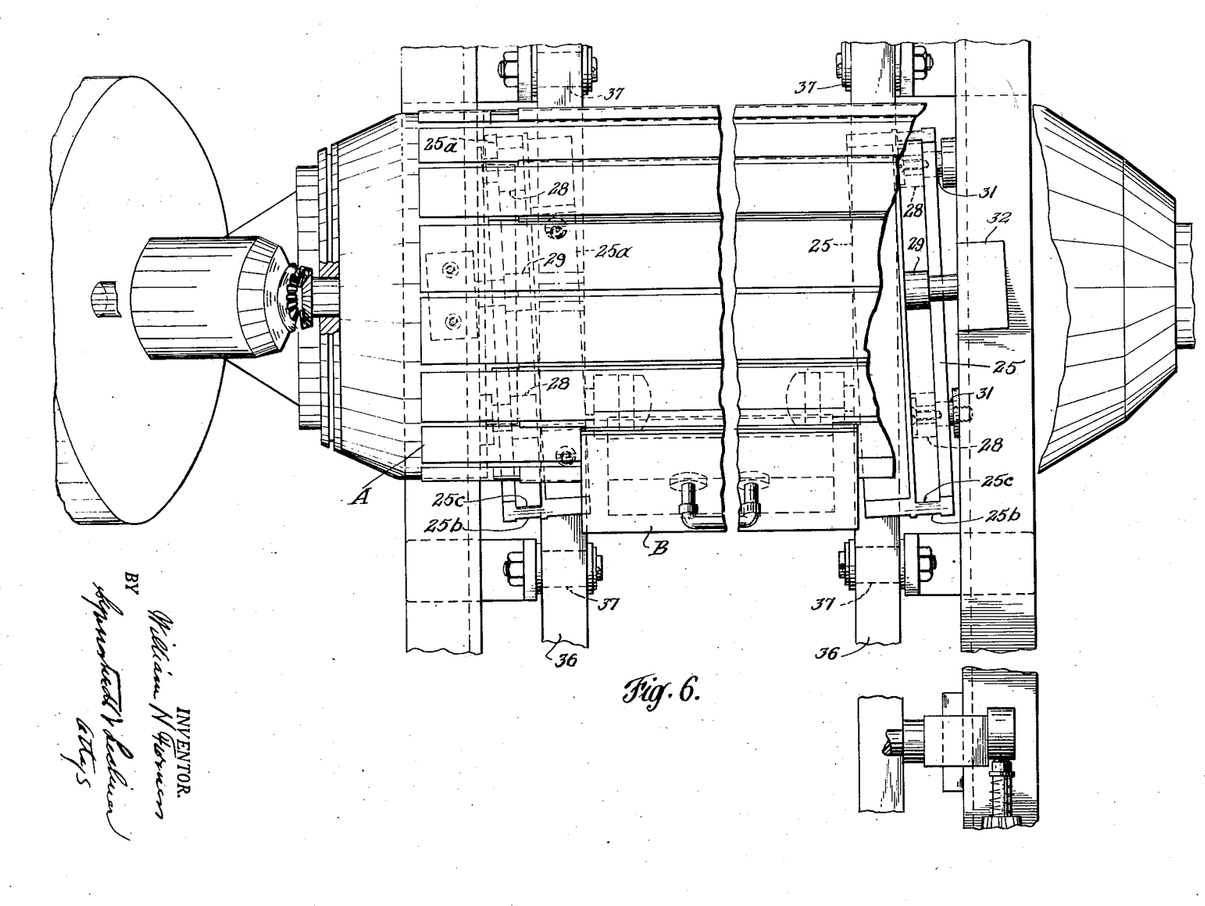
Fig. 6 is a broken away fragmentary plan view of Fig. 1 on an enlarged scale.

Although the turns of the helix are being shifted from the receiving end of the cylinder to the discharge end thereof, no detrimental rubbing action or relative lengthwise movement of translation between the arcuate housing B and the yarn turns can occur, by reason of the fact that the arcuate gear members 25, 25a are mounted to move at an angle to the horizontal axis of the cylinder corresponding to the pitch of the helix as shown in Fig. 6, when the housing is in contact with the cylinder. Stated in another way, by moving the members 25, 25a when in contact at the same angle as the pitch of the helix, the cylinder bars can function to move the turns longitudinally of the cylinders without detrimental interference from the arcuate housing B.

It will be observed that the pulsating action is reinitiated somewhat before the device B reaches its starting position and is brought into contact with the helix. Thus it is ensured that the compartments are filled with liquid at the time the device reengages the helix.

Since the reel rotates very slowly, any liquid not sucked back during the pulsations of a bag, will localize at the bottom of the reel and on its outer surface adjacent such bag. Such liquid, however, will not comingle with the liquid from the adjacent compartment, by reason of the intervening suction or vacuum compartment.

I have shown but one device B, partially surrounding the reel, but it is to be understood that by using more than one such device, substantially the entire periphery, or any desired part thereof, may be surrounded.

While the invention is most effectively used in connection with the type of reel shown in the aforementioned application, it may nevertheless be used with known reels for laying up yarn in the form of a helix, of which there are quite a number.

The pushing of the treatment liquid into the helix and the withdrawal thereof, which gives a sort of scrubbing action, finds particular utility in the production of tow. The bundle of tow is comprised of a great multiplicity of filaments and may run up into thousands of filaments. Such a bundle is very substantial in cross section, and although it would tend to flatten out on the reel into a somewhat ribbon-like form, nevertheless the ribbon would still have substantial body, cross-sectionally considered. The alternate repeated forcing or pushing of the liquid into such a bundle and then withdrawing it is effective in the treatment of tow.

I claim:

1. The process of applying liquid treatment to yarn being laid up on a reel in the form of a helix which comprises supporting a body of the liquid closely adjacent to the periphery of the reel and rapidly pulsating liquid of said body into and out of the same portion of the helix for a substantial period whereby the yarn is subjected to a scrubbing action.

2. The process of applying liquid treatment to yarn being laid up on a reel in the form of a helix which comprises supporting a body of the liquid closely adjacent to the periphery of the reel and repeatedly alternately applying liquid of said body to the helix and withdrawing it in rapid sequence while confining the flow of liquid to the helix to the peripheral region of the reel.

3. In apparatus for the liquid treatment of yarn, the combination of a reel on which the yarn is laid up in a helix, a liquid compartment mounted adjacent to the reel and perforate in its face adjacent to the reel, and means for pulsating the liquid in the compartment back and forth through the perforate face into and out of the helix.

4. In apparatus for the liquid treatment of yarn, the combination of a reel on which the yarn is laid up in a helix, a liquid compartment mounted adjacent to the reel and perforate in its face adjacent to the reel, means for pulsating the liquid in the compartment back and forth through the perforate face into and out of the helix, and mounting means for the compartment providing for movement of the compartment to and from the reel and for circumferential movement of the compartment concurrently with the reel and in the reverse direction.

5. In apparatus for the liquid treatment of yarn, the combination of a reel on which the yarn is laid up in a helix, a liquid compartment mounted adjacent to the reel and perforate in its face adjacent to the reel, means for pulsating the liquid in the compartment back and forth through the perforate face into and out of the helix, mounting means for the compartment providing for movement of the compartment to and from the reel and for circumferential movement of the compartment concurrently with the reel and in the reverse direction, and means for imparting said movements.

6. In apparatus for the liquid treatment of yarn, the combination of a reel on which the yarn is laid up in a helix, a liquid compartment mounted adjacent to the reel and perforate in its face adjacent to the reel, means for pulsating the liquid in the compartment back and forth through the perforate face into and out of the helix, and mounting means for the compartment providing for movement of the compartment to and from the reel and for circumferential movement of the compartment concurrently with the reel at an angle corresponding to the pitch of the helix and in the reverse direction.

7. In apparatus for the liquid treatment of yarn, the combination of a reel on which the yarn is laid up in a helix, a liquid compartment mounted adjacent to the reel and perforate in its face adjacent to the reel, means for pulsating the liquid in the compartment back and forth through the perforate face into and out of the helix, mounting means for the compartment providing for movement of the compartment to and from the reel and for circumferential movement of the compartment concurrently with the reel and in the reverse direction, and means for temporarily interrupting the pulsations when the compartment is moved away from the helix.

8. In apparatus for the liquid treatment of yarn, the combination of a reel on which the yarn is laid up in a helix, a liquid compartment mounted adjacent to the reel and perforate in its face adjacent to the reel, and means for pulsating the liquid in the compartment back and forth through the perforate face into and out of the helix, said compartment including a perforate compressible liquid containing bag.

9. In apparatus for the liquid treatment of yarn, the combination of a reel on which the yarn is laid up in a helix, a liquid compartment mounted adjacent to the reel and perforate in its face adjacent to the reel, and means for pulsating the liquid in the compartment back and forth through the perforate face into and out of the helix, and means adjacent said compartment for sucking off liquid from the reel working laterally past said compartment.

10. In apparatus for the liquid treatment of yarn, the combination of a reel on which the yarn is laid up in a helix, a plurality of liquid compartments arranged longitudinally of the reel and spaced apart from one another, a suction compartment between adjacent liquid compartments, said liquid compartments having their faces adjacent to the reel perforate, and means for pulsating the respective liquids back and forth through the perforate faces into and out of the helix.

11. In apparatus for the liquid treatment of yarn, the combination of a reel on which the yarn is laid up in a helix, a plurality of liquid compartments arranged longitudinally of the reel and spaced apart from one another, a suction compartment between adjacent liquid compartments, said liquid compartments having their faces adjacent to the reel perforate, and means for pulsating the respective liquids back and forth through the perforate faces into and out of the helix, said compartments having mounting means providing for movement to and from the reel and for circumferential movement concurrently with the reel and in the reverse direction, means for effecting said movements, means for temporarily interrupting the pulsations when the compartments are moved away from the helix, and means for cutting off the suction from the suction compartments when the compartments are moved away from the reel.

12. The process of claim 1 characterized by that liquid is so applied at a plurality of regions spaced from one another longitudinally of the reel and by that any liquid carried into the said intervening space or spaces is sucked off from the reel.

13. The process of claim 1 characterized by that the reel is rotated and liquid is applied and withdrawn during rotation of the reel and by that liquid is applied to and withdrawn from successive portions each of a substantial number of degrees but less than 360°.

14. The process of claim 1 characterized by that the reel is rotated and liquid is applied and withdrawn during rotation of the reel and by that liquid is applied to and withdrawn from successive arc portions each of a substantial number of degrees but less than 360° with circumferential overlap whereby all portions circumferentially of the helix are treated in each revolution of the reel.

WILLIAM H. FURNESS.

REFERENCES CITED

The following references are of record in the file of this patent:

UNITED STATES PATENTS

| Number | Name | Date |
|---|---|---|
| 1,983,221 | Furness | Dec. 4, 1934 |
| 2,020,057 | Hartmann | Nov. 5, 1935 |
| 2,416,533 | Naumann | Feb. 25, 1947 |